Nov. 19, 1963 J. Y. MA 3,111,636
BALANCED HIGH PASS VHF ANTENNA COUPLER HAVING ONE SHUNT INDUCTOR CENTERTAPPED TO GROUND AND ANOTHER SHUNT INDUCTOR CENTERTAP FLOATING
Filed April 7, 1961
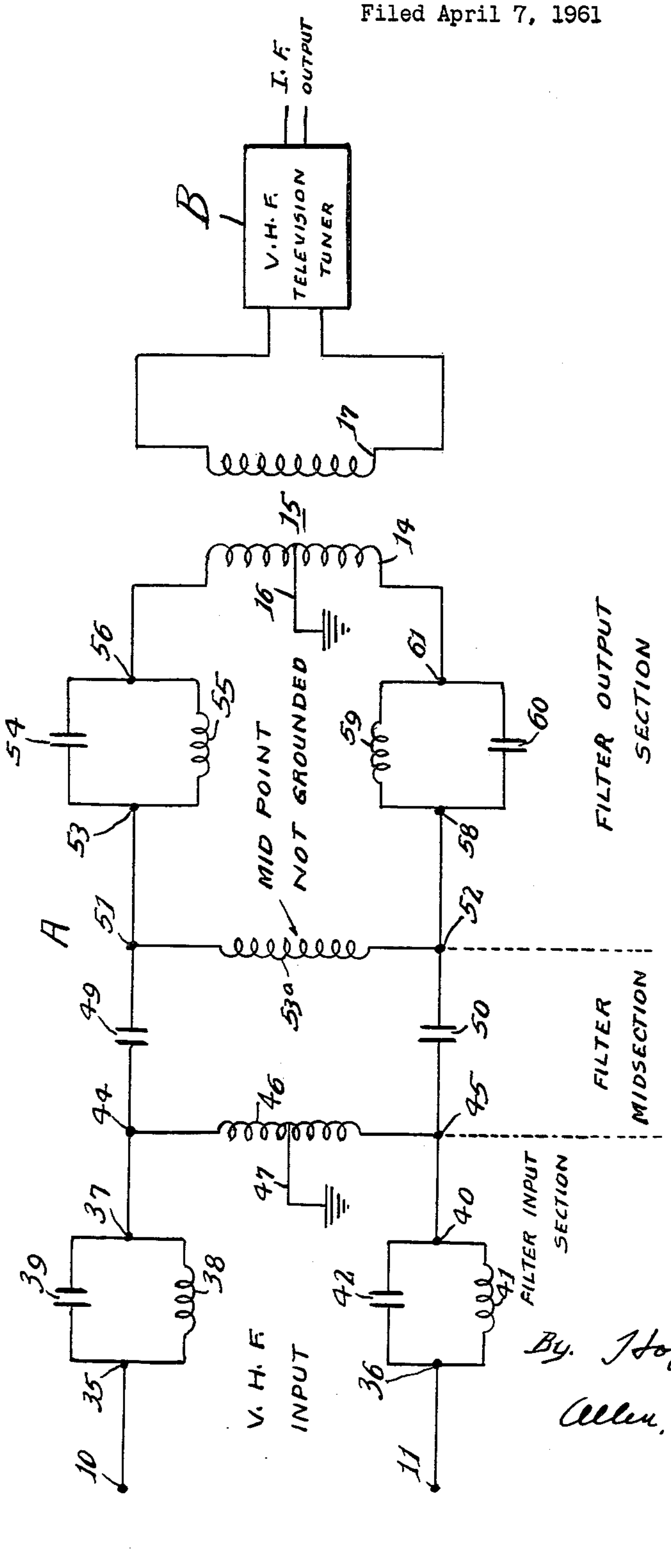
Inventor.
John Y. Ma.
By. Hofgren, Wegner, Allen, Stellman & McCord
Attorneys.

United States Patent Office 3,111,636 Patented Nov. 19, 1963

3,111,636

BALANCED HIGH PASS VHF ANTENNA COUPLER HAVING ONE SHUNT INDUCTOR CENTERTAPPED TO GROUND AND ANOTHER SHUNT INDUCTOR CENTERTAP FLOATING

John Y. Ma, Maywood, Ill., assignor to Oak Manufacturing Co., Crystal Lake, Ill., a corporation of Delaware Filed Apr. 7, 1961, Ser. No. 101,415
4 Claims. (Cl. 333—76)

This invention relates to an improved high pass filter for a balanced VHF (very high frequency) TV tuner antenna input transformer and associated tuned circuit. The invention is particularly adapted for TV systems wherein the frequency spectrum to be covered by a tuner ranges from substantially 54 megacycles (mc.) and up, this corresponding to the TV broadcast band beginning with channel 2 as established in the United States. While the invention is applicable to other frequency bands, and other radio frequency receiving means utilizing a balanced input system, for convenience it will be discussed with reference to generally established practice in the television industry of the United States.

It is well known that each TV channel has a band width of 6 mc. beginning with channel 2 at 54 mc. The improvement to which this invention relates is primarily concerned with the improvement of performance characteristics of the system in the bottom two or three channels (channels 2 to 4 inclusive) ranging from 54 mc. to 72 mc. Above the frequencies corresponding to channel 4, the beneficial effects of the present invention cease to be significant. It is understood however, that if the entire spectrum were shifted to start from a higher frequency case, as for example, say 22 mc. as the bottom of a spectrum, then the invention would benefit the bottom 12 to 18 mc. region in this translated frequency spectrum. In other words, the invention is applicable in general to the lower part of an extended frequency range in the field generally designated as very high frequencies, wherein a balanced input is used.

In the United States, it is customary to operate TV receivers on a superheterodyne principle. The incoming frequency from an antenna is mixed with an oscillator frequency to provide an intermediate frequency (I.F.). The intermediate frequency lies in a fixed band usually at 41.5–45.75 mc. This intermediate frequency is close to channel 2. Tuning is accomplished, among other things, by changing the oscillator frequency, thus keeping the I.F. at the assigned value, for each selected channel.

It is necessary to avoid undesirable interference from cross-modulation in the R.F. amplifier and also undesired I.F. feed-through to the mixer stage, I.F. amplifier section, and the second detector. Therefore, desirable operation of a TV receiver requires that all unwanted low frequency and I.F. signals below the lowest tunable desired channel be suppressed in the VHF input of the system and preferably ahead of the input to the first R.F. stage. As applied here, this would mean that all frequencies beginning with zero and extending up close to 54 mc. should be suppressed and that the attenuation be sufficiently complete so that a high ratio of wanted signal to rejected signals be present.

This may be re-stated by pointing out that a high pass filter with a sharp cut-off as close as possible to 54 mc. should be provided. Such high pass filters have long been used in connection with high performance TV tuners. These filters are usually of the balanced type. A good filter design may utilize an input "M derived" half filter section feeding an intervening "constant K" section which in turn feeds an output "M derived" half filter section. This is connected to the input terminals of a balanced to ground R.F. signal input transformer primary.

It is of course well known in filter design that the more sections there are to a filter, the more effective the attenuation of undesired signals becomes. In the case of a high pass filter, an ideal characteristic would provide complete suppression of all frequencies from zero up to almost 54 mc. and transition through a precipitate change to no suppression for desired frequencies immediately at and above 54 mc. In practice, this ideal is not realized. In TV receivers, the cost of adding high quality filter sections is usually a serious deterrent so that inefficient cut-off action with a minimum number of sections is tolerated. The resultant lack of attenuation and the absence of a sharp cut-off permits undesired frequencies ranging from about 47 mc. to as much as 54 mc. to pass to some degree. If on the other hand, highly effective cut-off is desired up to about 54 mc. then substantial side effects of rapid cut-off in attenuation extend well into the desired channels as high as 4 or 5 and interference with proper operation in these channels is encountered. This is due to interaction of the filter components with the input transformer primary winding.

Apart from the questions of attenuation of rejected signals and the number of filter sections used, the requirements of a balanced type of high pass filter creates serious problems as regards unimpaired transfer of desired balanced signals. Balanced high pass multi-section filters are well known as a precision form of filter and are widely used in many types of apparatus. Such apparatus with precision balanced filters are not generally manufactured for popular use since the demands for precision alignment and accuracy outweigh considerations of allowable cost. Such filters from their very nature ordinarily require high precision in the values of components. For example, filters have inductors and capacitors. In order to maintain both the unwanted and desired signal balance in a filter, the values of such inductors and capacitors must be very accurate for efficient operation.

A high pass filter system for use with a TV receiver in the VHF input must fulfill two broad requirements. One is to suppress effectively frequencies below the cut-off value; in this case below 54 mc. The other requirement is to pass desired balanced frequencies with minimum attenuation and minimum balance deterioration. A balanced filter with its components manufactured precisely according to requirements performs these functions quite effectively.

A balanced high pass filter having a minimum number of sections and constructed of components having substantial tolerances aligned in accordance with normal practice usual in commercial receivers does not perform satisfactorily. This is due to the fact that the filter is not accurately balanced. Consequently unbalanced in-phase signals above the cut-off frequency will be processed by a defectively balanced filter so as to transform unbalanced signals into the equivalent of partially balanced signals. The transformed balanced component of the aforementioned undesired signals will then pass through the balanced antenna transformer and will produce interference with the desired signal in the receiver output.

A defective balance in a balanced design filter also has a tendency to reduce the amplitude of desired balanced signal frequencies. The total effect of such a balance defect in the filter system is to significantly reduce the rejection abilities of the tuner and thus reduce the ratio of desired R.F. signal to undesired R.F. signals.

In the design of a balanced filter system, the ratio of inductance to capacitance ($L/C$), as well as the individual values of L and C, are important and should be maintained accurately in both sides of the line. The values of capacitors in filter systems for VHF TV receivers of this character are usually of the order of about 10 mmf. Such capacitors are generally fixed and commercial tolerances of the order of plus or minus 5% in value must be accepted, unless cost is disregarded. The value of L can be varied by squeezing or spreading the turns of the winding. As a rule, a desired capacitor C is coupled to an inductor L and the two components are connected to a source of predetermined frequency. L is then adjusted so that the combination of L and C is resonant to the particular aforementioned frequency.

Capacitors C, which vary in value commercially, are responsible for the unbalanced to ground condition of a filter system. In a filter system embodying the invention there will be at least four portions, each consisting of an inductor shunted by a capacitor. It is thus evident that accumulated tolerances can and do unbalance a filter so badly that unsatisfactory performance results.

Where multi-section balanced high pass filters have been used, this state of affairs has been tolerated principally because the obvious cure—a more precisely balanced filter—was to expensive to use. TV industry requirements for good practice normally demand that there be at least about 25 db attenuation in undesired unbalanced R.F. frequencies with regard to desired balanced R.F., particularly in frequencies immediately above 54 mc., in the bottom channels of the TV spectrum.

This invention provides a filter system which has all the rejection characteristics of a precision balanced filter system of conventional construction without the requirement of high cost precision in components and alignment. This desirable objective is attained in a remarkably simple manner. Generally, the invention involves changing the output "M derived" half section of a balanced filter from a balanced to ground type to a symmetrical section across the line but in off-ground connection. This change is accomplished by the simple expedient of omitting the normally grounded center balance point of the last "M derived" half section of the filter immediately prior to the terminals which feed the balanced input antenna transformer. By virtue of this change, a remarkable increase in unbalanced R.F. rejection performance is obtained for the lower channels (2 to 4 inclusive) of a VHF TV receiver. The high pass filter design otherwise follows conventional practice.

For a more complete description of the invention, reference will now be made to the drawing illustrating in diagrammatic form the invention as applied to a TV receiver.

A generally balanced high pass filter indicated by "A," described in detail later, has balanced input terminals 10 and 11 connected to a suitable source of VHF signals such as, for example, a TV receiving antenna. Filter A feeds its output to primary winding 14 of an output antenna transformer 15. Primary winding 14 has its midpoint 16 grounded usually by a direct wire connection. However, the ground may be established through a capacitor if desired for effectively grounding the center point for alternating currents of desired signal frequency while providing essentially off-ground operation for very low frequencies, as power line frequencies.

Antenna transformer 15 is one of a number of types widely used in TV tuners and is adapted to handle frequencies ranging from about 54 mc. to about 216 mc., this representing channels 2 to 13 inclusive. Antenna transformer 15 has secondary 17 connected with a VHF television tuner B, from which an intermediate frequency (IF) output is derived.

The design of antenna transformer 15, here illustrated as a balun, may be modified to provide a balanced secondary instead of unbalanced winding 17 as shown.

Referring now to part A, a balanced high pass input filter composed of an "M" derived input half section, a "constant K" mid section and modified "M" derived output half section are shown. Terminals 10 and 11 are connected respectively to junction points 35 and 36. Junction point 35 is connected to junction point 37 through inductor 38 and capacitor 39 in shunt. These two cooperate to provide a filter portion.

Similarly, junction point 36 is connected to junction point 40 by inductor 41 and capacitor 42 also in shunt. It is understood that capacitors 39 and 42 will be matched within commercial tolerances of about 5%.

Terminals 37 and 40 are connected respectively to terminals 44 and 45, across which is connected inductor 46 center tapped at 47, which point is grounded. Inductor 46 may consist of two separate inductors matched to commercial tolerances. In any event, center tap 47 should, insofar as inductance is concerned, be at the midpoint within plus or minus about 5% from terminals 44 and 45. The ground may be metallic or through a capacitor having sufficiently large capacitance to have low impedance for VHF alternating currents. In such case, a static drain resistor will generally be connected across such grounding capacitor.

Terminals 44 and 45 are connected through matched capacitors 49 and 50 to junction points 51 and 52. Capacitors 49 and 50 are also matched within conventional commercial tolerances of the order of about 5%.

Between junction points 51 and 52 is inductor 53*a*. The value of one half the required inductance of inductor 53*a* is predetermined by well known filter design for a constant "K" section matched to an "M" derived half section, and may be adjusted to a desired accurate value. Contrary to practice and contrary to accepted theoretical design requirements, inductor 53*a* does not have any center tap returned to ground. This eliminates the necessity for two coils or a center tap.

Junction point 51 is connected to junction point 53 of a filter section. Junction point 53 is connected through capacitor 54 and inductor 55 to junction point 56.

Similarly, junction point 52 is connected to junction point 58 of a companion filter section. Junction point 58 is connected through inductor 59 and capacitor 60 in shunt to each other to junction 61. It is understood that capacitors 54 and 60 are matched, the same being true for capacitors 39 and 42, the matching, however, being within commercial tolerances of about 5% rather than much smaller tolerances of precision filters. It is also understood that inductors are tuned with respect to their respective shunt capacitors as is usual in filter alignment practice.

The output of the filter system at terminals 56 and 61 is fed to primary winding 14 as previously described.

It has been found that with a filter system such as disclosed above and capacitors having commercial tolerances of 5%, the filter system effectively suppresses both balanced and unbalanced frequencies below the desired limit of 54 mc. (channel 2) and in conjunction with a well designed balanced transformer 15, the unbalanced R.F. signals are processed with attenuation of about 32 db for channel 2, 27 db for channel 3 and substantially the same for channel 4. The same filter with a ground at the center of inductor 53 provided the following attenuation results: 8 db for channel 2; 23 db for channel 3; and about 28 db for channel 4. The performance for channels 5 and up were substantially the same for both the ungrounded and grounded condition.

By eliminating the ground for the mid point of inductor 53, a saving in cost is effected, since it is unnecessary to provide a center tap or to break inductor 53 into two separate coils. The above performance figures are typical of a well designed filter system for TV receivers and may vary somewhat among filters.

In the actual design of a filter, inductors and capacitors from adjacent filter sections become merged into larger components. For example, capacitor 39 and inductor 38 cooperates with the part of inductance 46 between terminals 44 and 47 to provide a half section of shunt "M" derived filter. The entire filter section includes the entire inductance 46, capacitors 39 and 42 and inductors 38 and 41. A half section of constant "K" filter has a capacitor in the line and an inductor across the line. When the "M" derived and constant "K" sections are connected, it is possible to combine inductors and capacitors. Hence inductors 46 and *53a* each include the values of inductors necessary for the "M" and "K" sections. Similarly, capacitors 49 and 50 each replace two separate series connected capacitors of two half section "K" filters. This is well known in the art. The first or input "M" derived balanced section has its output grounded at 47. The input part of the "constant K" derived section shares the same ground at 47. The output of the "constant K" section and input of the final "M" derived half section have no ground and are across the line.

As an example, a filter section for TV receiver use in the United States would have inductors 38, 55, 41 and 59 each about .34 microhenries. Capacitors 39, 54, 42 and 60 would each be about 39 micromicrofarads. A filter portion consisting of a capacitor and one shunt inductor should be tuned to a frequency of 90 megacycles. Capacitors 49 and 50 would each be about 10 mmf. Inductors 46 and 53 would each total about .6 microhenries. It is understood that tolerances would be as previously stated. Such a filter would have 300 ohm lines going to and from the filter. Output winding 14 would of course be designed to match the filter and would embody good design practice.

If the filter is to be used with a balanced line whose impedance is different from 300 ohms, then the typical values given above would not necessarily apply.

What is claimed is:

1. A balanced dual line very high frequency electrical signal filter system having two input terminals, two output terminals, a ground plane, four parallel tuned high frequency circuits, two resonating capacitors, a center tapped shunt coil and an untapped shunt coil, connections disposing two of said four parallel tuned circuits in series with one of said two resonating capacitors in each respective leg of said dual line between said input and said output terminals, each resonating capacitor being between adjacent two parallel tuned circuits, connections disposing said center tapped shunt coil and said untapped shunt coil from line to line at the junctions of said series connected resonating capacitors and parallel tuned circuits, connections from the center tap of said center tapped shunt coil for alternating currents to said ground plane, said untapped shunt coil located on that side of the resonating capacitor closest to said output terminals, said filter component values and tuning causing all frequencies below the lowest desired VHF signals to be greatly attenuated.

2. In a two-line signal handling system exposed to signal frequencies ranging from about 60 cycles per second to frequencies in excess of 72 megacycles per secand, a balanced high pass filter for attenuating substantially all signals below 54 megacycles per second comprising: a pair of input terminals; a pair of output terminals; means defining a reference potential; a pair of substantially equal parallel resonant series elements connected with said input terminals, one in each line of said system; a first shunt inductor element connected between said series elements, remote from said input terminals, and having a center tap connected with said reference potential means; a pair of substantially equal series capacitor elements, one connected in each line and in series with said parallel resonant elements; a second pair of substantially equal parallel resonant series elements one connected in each line, in series between each of said capacitor elements and said output terminals; and a second shunt inductor element connected from one of said lines to the other, between said capacitor and second parallel resonant series elements, said second shunt element being free of a tap and being isolated from said reference potential means by said capacitor and second parallel resonant series elements.

3. In a television tuner, a balanced two-line signal input system exposed to frequencies ranging from about 60 cycles per second, to frequencies in excess of 72 megacycles per second, a balanced high pass filter for attenuating all signals below and unbalanced signals above 54 megacycles per second; a pair of input terminals; means defining a reference potential; a pair of substantially equal parallel resonant series elements connected with said input terminals, one in each line of said system; a pair of substantially equal series capacitor elements, one connected in each line and in series with said parallel resonant elements; a first shunt inductor connected between said lines at points between said parallel resonant and capacitor elements, said first shunt inductor element having a center tap connected with said reference potential means, said first shunt element forming with said pair of parallel resonant elements, a balanced to reference filter input section, and with said pair of series capacitor elements a balanced to reference input of a filter midsection; a second pair of substantially equal parallel resonant series elements, one connected in each line in series with said capacitor elements; a second shunt inductor element connected from one of said lines to the other, between said capacitor and second parallel resonant series elements, said second shunt element being free of a tap and being isolated from said reference potential means by said capacitor and second parallel resonant series elements, said second shunt element forming with said capacitor elements a balanced off reference output of said filter midsection and with said second pair of parallel resonant series elements a balanced off reference filter output section; and an output transformer having a primary winding connected with said second parallel resonant circuits.

4. The filter of claim 2 including an output coupling transformer having a primary winding connected with said output terminals, said primary winding having a center tap connected with said reference potential means.

References Cited in the file of this patent

UNITED STATES PATENTS

| | | |
|---|---|---|
| 1,752,461 | Shea | Apr. 1, 1930 |
| 2,204,721 | Blumlein | June 18, 1940 |
| 2,728,818 | Mackey | Dec. 27, 1955 |
| 2,779,924 | Du Chatellier | Jan. 29, 1957 |

OTHER REFERENCES

RCA Victor Service Data, 1959, No. 17, Second edition, first printing. Received in Patent Office October 8, 1959, page 24 showing the KRK87D UHF/VHF Tuner cited.

Johnson: Transmission Circuits for Telephone Communication, Van Nostrand, 5th printing, 1931, pages 227 and 228 cited.